March 29, 1932.  C. B. MIRICK  1,851,947
IGNITION METER
Filed Dec. 3, 1927
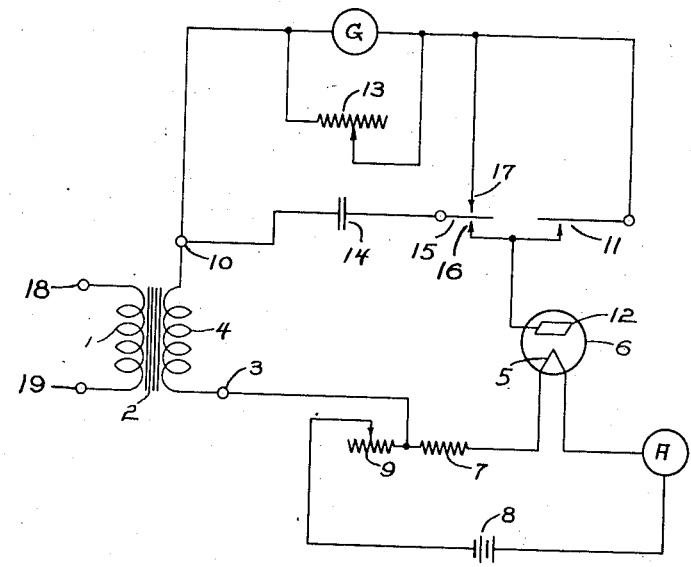
INVENTOR.
Carlos B. Mirick
BY Harold Todd
ATTORNEYS.

Patented Mar. 29, 1932

1,851,947

UNITED STATES PATENT OFFICE

CARLOS B. MIRICK, OF WASHINGTON, DISTRICT OF COLUMBIA, ASSIGNOR TO NATIONAL ELECTRICAL SUPPLY COMPANY, OF WASHINGTON, DISTRICT OF COLUMBIA, A CORPORATION OF VIRGINIA

IGNITION METER

Application filed December 3, 1927. Serial No. 237,579.

(GRANTED UNDER THE ACT OF MARCH 3, 1883, AS AMENDED APRIL 30, 1928; 370 O. G. 757)

My invention relates broadly to apparatus for measuring the effects of weak and erratic alternating currents and more particularly to apparatus for the galvanometric measurement of the maximum intensity of variable currents.

The object of my invention is to produce an apparatus which may be utilized to measure the effects of alternating currents that are weak or erratic such as the currents employed in the ignition systems of internal combustion engines or those alternating currents produced in radio apparatus by static or strays.

Further objects of my invention will appear more fully hereinafter as the description of the method and apparatus is developed.

My invention consists substantially in the construction, combination and arrangement of parts associated therewith or as will be more fully hereinafter set forth as shown by the accompanying drawing and finally pointed out in the appended claims.

Reference is to be had to the accompanying drawing forming a part of this specification in which the figure is a diagrammatic arrangement of the electrical apparatus embodying my invention.

Referring to the drawing numeral 1 represents the primary of a transformer 2 which is used to couple my device to the apparatus in which are flowing the currents whose effects it is desired to measure. One terminal 3 of the secondary of the transformer 2 is connected to the filament 5 of a thermionic rectifier 6 through a resistance 7. The heating current for the filament of the thermionic rectifier 6 is supplied from a source of direct current power 8 through a rheostat 9 and the resistance 7. A milliammeter A is provided in series in this circuit for the determination of the correct current to be supplied to the filament of the thermionic rectifier 6.

The other terminal 10 of the secondary 4 of the transformer 2 is connected to one terminal of a galvanometer G, the other terminal of which is connected through a switch 11 to the anode 12 of the thermionic rectifier 6. In parallel with the galvanometer G, I have provided a variable resistance 13 to shunt a portion of the current flowing in the anode circuit of the thermionic rectifier around the galvanometer in case the current to be measured is higher than the limit to which the galvanometer G will read. The resistance 7 provides a sufficient negative bias to prevent any deflection of the galvanometer G when no current is flowing in the primary 1 of the transformer 2.

In addition to the above described circuit, in which there is a direct reading of the current flowing in the anode circuit of the thermionic rectifier, I have provided a circuit in which the current may be measured by charging a condenser in the anode circuit of the rectifier and then discharging the condenser through the galvanometer G.

This circuit consists of a connection from the terminal 10 of the secondary 4 of the transformer 2 to one terminal of a condenser 14, the other terminal of which is connected to a double-throw switch 15. One terminal 16 of the switch 15 is connected to the anode 12 of the thermionic rectifier 6. The other terminal 17 of the switch 15 is connected to the galvanometer G.

The operation of the device is as follows. The terminals 18 and 19 of the primary 1 of the transformer 2 are either connected directly to the circuit in which the alternating current that it is desired to measure is flowing or in parallel with a known resistance in series with that circuit. The switch 15 is open and the switch 11 is closed. When the filament 5 of the thermionic rectifier 6 is heated to the proper temperature as indicated by the milliammeter A the deflection shown by the galvanometer G gives a value that is proportionate to the amount of current flowing in the circuit under test. Should the current in the circuit under test be erratic the switch 11 is opened and the lever 20 of the switch 15 is pressed against the contact 16 and held in this position for a suitable period of time during which the effect of the applied voltage is integrated. The lever 20 is then shifted to the contact 17 and the deflection of the galvanometer G is noted. By the comparison of this deflection with the calibration curve of the galvanometer G the said integrated effect may be measured.

It is to be understood that the thermionic rectifier 6 may be replaced by any rectifier which is sensitive enough to rectify weak currents. I have used a plurality of three element vacuum tubes such as have been used in radio apparatus, with the grid shorted to the plate with very good success. Further, liquid rectifiers, if stable, serve the purpose equally as well.

It will be understood that the above description and accompanying drawing comprehends only the general and preferred embodiment of my invention and that minor detail changes in the construction and arrangement of parts may be made within the scope of the appended claims without sacrificing any of the advantages of my invention.

The invention herein described may be manufactured and used by or for the Government of the United States for governmental purposes without the payment to me of any royalty thereon or therefor.

What I claim is as follows:

1. In an alternating current meter, the combination of a rectifier, means for coupling the rectifier to the source of alternating current, a galvanometer in series with the rectifier, a switch in series with the galvanometer and the rectifier, a condenser in parallel with the galvanometer and a double pole switch, one pole of which is in series with the condenser and the rectifier and the other pole of which is in series with the condenser and the galvanometer.

2. In an alternating current meter, the combination of a thermionic rectifier, a source of power therefor, a variable resistance and a fixed resistance in series with the said source and the filament of the thermionic rectifier, a filament anode circuit for the rectifier, said filament anode circuit including the said fixed resistance, means for coupling the rectifier to the source of alternating current to be measured, a measuring device, a condenser and means for alternately placing the condenser in series with the coupling means and the rectifier and in parallel with the measuring device.

3. In an alternating current meter, the combination of a thermionic rectifier, a source of power therefor, a variable resistance and a fixed resistance in series with the said source and the filament of the thermionic rectifier, a filament anode circuit for the rectifier, said filament anode circuit including the said fixed resistance, means for coupling the rectifier to the source of alternating current to be measured, a measuring device, a condenser, means for alternately placing the condenser in series with the coupling means and the rectifier and in parallel with the measuring device, and means for placing the measuring device in series with the rectifier and the coupling means.

4. In an alternating current meter, the combination of a thermionic rectifier, a source of power therefor, a variable resistance and a fixed resistance in series with the source of power and the filament of the thermionic rectifier, and a filament anode circuit for the rectifier, said filament-anode circuit including a transformer, the secondary of which is connected in series with the fixed resistance and a measuring device and a condenser, and means for alternately placing the condenser in series with the anode of the thermionic rectifier and the secondary of the transformer and in parallel with the measuring device.

5. In an alternating current meter, the combination of a thermionic rectifier, a source of power therefor, a variable resistance and a fixed resistance in series with the source of power and the filament of the thermionic rectifier, and a filament anode circuit for the rectifier, said filament-anode circuit including a transformer, the secondary, of which is connected in series with the fixed resistance and a measuring device and a condenser, means for alternately placing the condenser in series with the anode of the thermionic rectifier and the secondary of the transformer and in parallel with the measuring device and means for placing the measuring device in series with the rectifier and the secondary of the transformer.

6. In an alternating current meter, the combination of a rectifier, means for coupling the rectifier to a source of alternating current, a condenser and a galvanometer, and means adapted to connect the condenser in series with the rectifier to charge said condenser and said means being also adapted to connect said condenser in series with said galvanometer to discharge said condenser through said galvanometer, whereby an indication of the maximum value of the alternating current in said source may be obtained.

CARLOS B. MIRICK.